United States Patent [19]

Ooshima

[11] Patent Number: 4,956,945
[45] Date of Patent: Sep. 18, 1990

[54] INTERNAL GRINDER

[75] Inventor: Jinichiro Ooshima, Narashino, Japan

[73] Assignee: Seiko Seiki Kabushiki Kaisha, Japan

[21] Appl. No.: 324,228

[22] Filed: Mar. 14, 1989

[30] Foreign Application Priority Data

Mar. 18, 1988 [JP] Japan .................................. 63-65099

[51] Int. Cl.$^5$ ............................................. B24B 49/00
[52] U.S. Cl. ............................... 51/165.93; 51/165.71;
51/165.77; 51/165.93
[58] Field of Search ........... 51/165 R, 165.71, 165.77,
51/165.93, 134 R, 290, 291

[56] References Cited

U.S. PATENT DOCUMENTS 4,180,946 1/1980 Heijkenskjold et al. .......... 51/134.5

Primary Examiner—J. J. Hartman
Assistant Examiner—M. Rachuba
Attorney, Agent, or Firm—Bruce L. Adams; Van C. Wilks

[57] ABSTRACT

An internal grinding apparatus having a grinding wheel attached to a spindle rotor radially and axially supported by electromagnetic bearings. Currents applied to the electromagnetic bearings are continuously controlled by a controlling system including a central processing unit during grinding work in order to adjust the longitudinal axis of the spindle rotor. The longitudinal axis of the spindle rotor is inclined and/or shifted at predetermined locations of the grinding wheel in a bore of a workpiece, thereby eliminating tapering of the long bore, and improving the cylindricality and straightness in grinding work.

24 Claims, 5 Drawing Sheets

INTERNAL GRINDER

BACKGROUND OF THE INVENTION

1. (Fields of the invention)

The present invention pertains to an internal grinding apparatus for grinding the surface of a long bore in a workpiece, and it particularly relates to an internal grinding apparatus which provides high cylindricality and straightness.

2. (Description of the prior arts)

Conventionally, when a long bore a of a workpiece 1 such as a plunger valve, is ground as shown in FIG. 5 and FIG. 6, the workpiece is rotated on the work head of the grinding machine, and a grinding wheel 4 provided at one end of a spindle rotor 2 through a grinding shaft (quill) 3 is also rotated at high speed. The rotating grinding wheel 4 is shifted (traversed) along the axis of rotation of the grinding wheel to thereby grind the surface of the long bore a.

However, since the quill bents during grinding work by such conventional internal grinding machine, the diameter of the long bore a of the workpiece 1 reduces as it reaches the outer end of the long bore as shown in FIG. 6, in other words, the long bore has a taper at the outer end thereof. As a result, the cylindricality and straightness are lowered.

In order to solve this problem, the applicant previously proposed a method in his own Japanese patent application No. 61-9769 which corresponds to the U.S. patent application Ser. No. 005,095 in which grinding work is carried out with the quill inclined at a predetermined angle after a point at which the quill starts bending.

However, in order to incline the quill, the mechanical clamps fastening the wheel spindle stock to the work table have to be loosened for adjusting the wheel spindle stock at a required angle using the eccentric cam, and thereafter the wheel spindle stock is fastened with the mechanical cramps again Because of this feature, this method has drawbacks: for example, it is not possible to continuously adjust the tilt angle; the mechanism is complicated; and it is difficult to make fine adjustment of the tilt angle due to backlash.

SUMMARY OF THE INVENTION

It is therefore an object of the present invention to provide high cylindricality and straightness in grinding work by an internal grinding machine It is another object of the present invention to provide an internal grinding machine in which a spindle rotor is supported by magnetic bearings, a grinding wheel attached at one end of the spindle rotor, and the axis of rotation of the grinding wheel is inclined by controlling currents which excite the magnetic bearings at predetermined longitudinal positions along the surface of a long bore drilled in a workpiece without interrupting grinding operation.

DETAILED DESCRIPTION OF THE PREFERRED EMBODIMENTS

Figure 1:
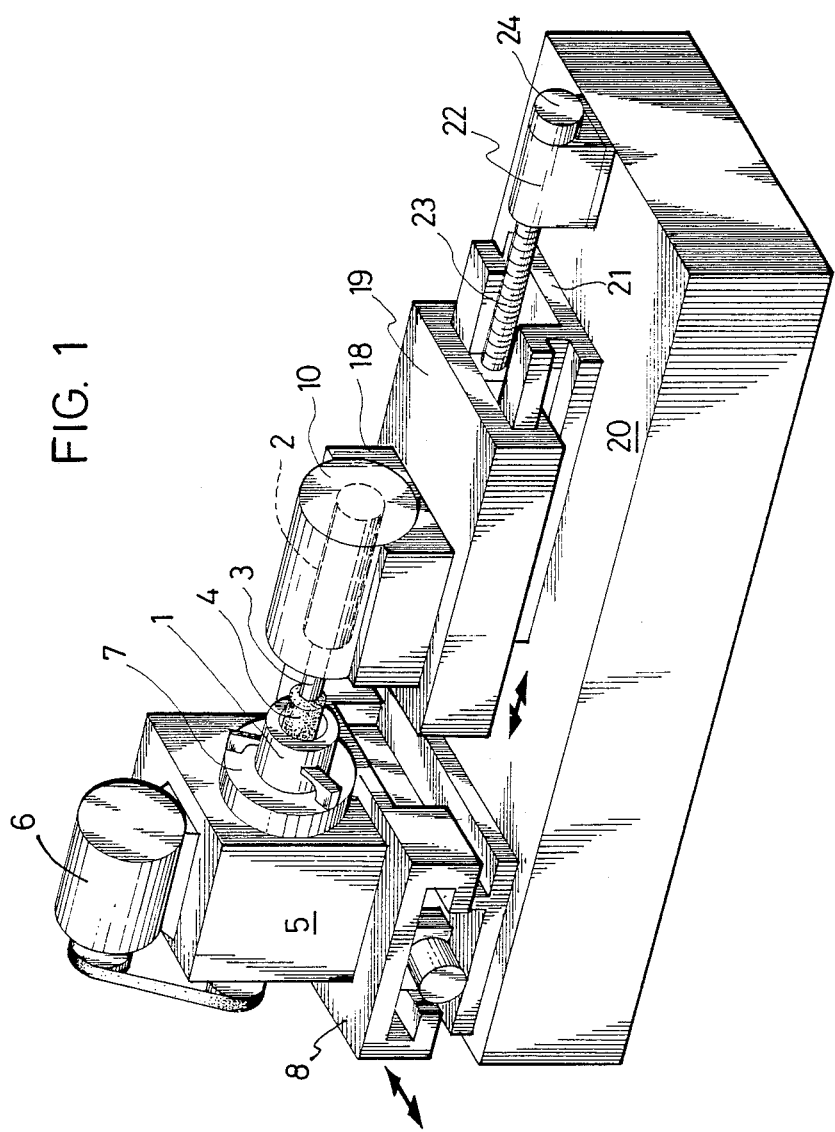
FIG. 1 is a perspective view showing an embodiment of an internal grinding apparatus according to the present invention.

FIG. 1 is a perspective view of an internal grinder according to the present invention. The numeral 1 is a workpiece, the numeral 2 is a spindle rotor and the numeral 3 is a quill provided at one end of the spindle rotor 2, and a grinding wheel 4 is provided at the tip of the quill 3.

The workpiece 1 is held at a chuck 7 which is rotationally driven by a motor 6 fixed on a work head 5. The work head 5 is mounted on a work table 8. The work table 8 can be moved in the direction perpendicular to the axis of rotation of the workpiece 1.

Figure 2:
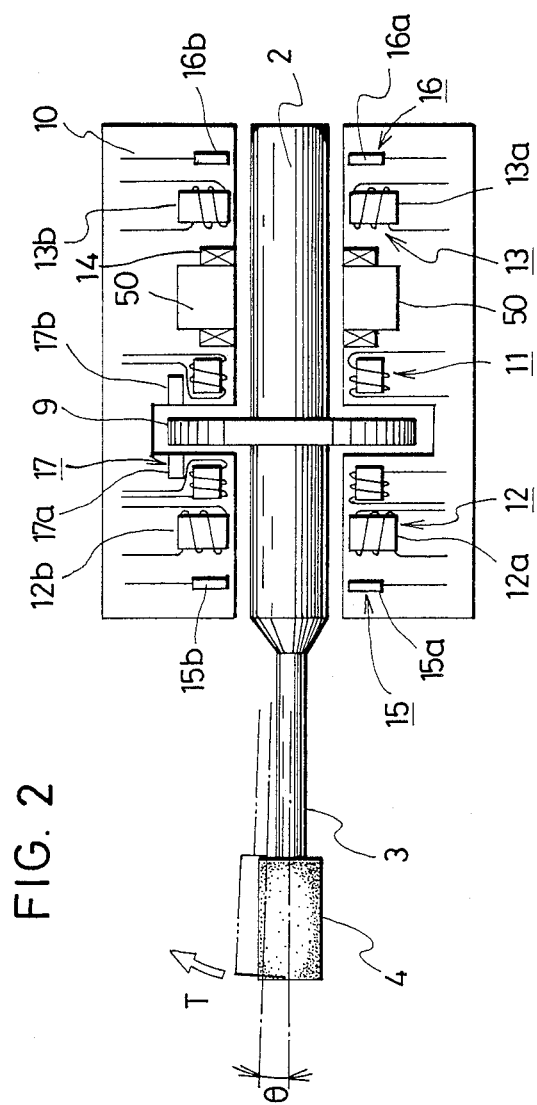
FIG. 2 is a sectional schematic view of a spindle head of an embodiment of a grinding apparatus according to the present invention.

The spindle rotor 2 is supported by magnetic bearings as shown in FIG. 2.

The spindle rotor 2 has a disk 9 fixed around the central portion thereof. The disk 9 is held in place by thrust magnetic bearings 11 which are provided on the spindle head 10. Axial direction force acting on the spindle rotor 2 is checked by the thrust magnetic bearings 11. The spindle rotor 2 is also supported by radial magnetic bearings 12 and 13 at both ends thereof.

These thrust and radial magnetic bearing mechanisms used for the present invention are well known in the art. The spindle rotor 2 is magnetically supported and floated between a plurality of pairs of electromagnets 12a, 12b, 13a and 13b. In this case, a gap of around 0.5 mm is maintained between the electromagnet and the periphery of the spindle rotor 2.

Therefore, the axis of the spindle rotor 2 can be inclined and/or shifted by controlling currents to excite the electromagnets 12a, 12b, 13a and 13b of the radial magnetic bearings 12 and 13. For example, when an excitation current applied to the electromagnets 12a and 13b is made larger than that applied to the electromagnets 12a and 13a, the spindle rotor 2 is held in a position with its axis shifted toward the electromagnets 12b and 13b by an amount corresponding to the difference in excitation current between these pairs; and when an excitation current applied to the electromagnet 12b is made larger than that applied to 12a, and at the same time an excitation current applied to the electromagnet 13b is made smaller than that applied to the electromagnet 13a, the axis of the spindle rotor 2 can be inclined relative to the central axis of the magnetic bearings.

By the tilt of the spindle rotor 2, the grinding wheel 4 can be inclined in the direction T at a tilt angle 8.

A motor stator 50 effects to rotate the spindle rotor 2 when a current flows through a coil 14. Therefore the spindle rotor 2 functions as a rotor of a motor and the motor stator 50 as a stator of a motor.

Position sensors 15 and 16 are provided at the right and left end portions of the spindle rotor 2. They are respectively composed of a pair of sensors 15a and 15b and a pair of sensors 16a and 16b. The position sensors detect radial positions of the spindle rotor 2 at the two supporting points, i.e., at the points between the electromagnets 12a and 12b, and between the electromagnets 13a and 13b. A position sensor 17 composed of a pair of sensors 17a and 17b detects the position of the disk 9.

The spindle 10 is fixed to a work table 19 through a spindle stock 18. The work table 19 is mounted on a guide member 21 fixed on a bed 20 in such a manner that it can be moved along the axis of the spindle rotor 2.

The work table 19 is moved by a thread screw 23 which is rotated by a servo motor 22, and the shift amount is detected by an encoder 24 directly connected to the servo motor 22.

Figure 3:
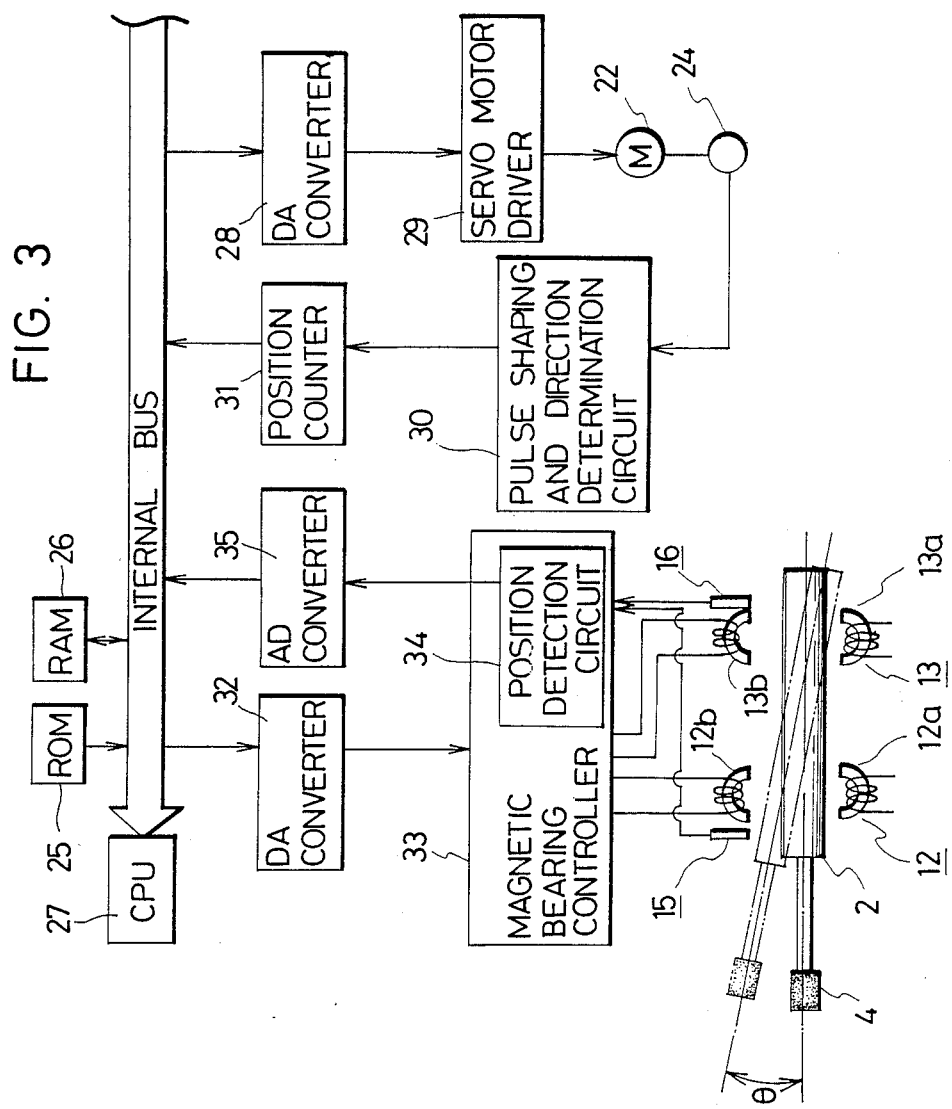
FIG. 3 is a block diagram showing an electrical structure of the control system in an embodiment of a grinding apparatus according to the invention.

FIG. 3 is a block diagram showing an electrical composition of an embodiment according to the present invention. The embodiment has a CPU 27 which carries out a required computation using a ROM 25 storing a system program and a RAM 25 storing a set of working memory. The CPU 27 totally controls all of the system of the equipment.

The servo driver 29 receives a control signal which is outputted from the CPU 27 and D/A converted by a D/A converter 28, and thereby rotationally drives the servo motor 22. The revolution speed of the servo motor 22 is detected by an encoder 24, and the detected signal is processed by a pulse shaping and direction determination circuit 30 and then sent through a position counter 31 to the CPU 27.

The CPU 27 provides an output signal through a D/A converter 32 to a magnetic bearing controller 33, and controls currents to excite electromagnets 12a 12b, 13a and 13b of the magnetic bearings 12 and 13. The radial position of the spindle rotor, which is controlled by the applied currents for excitation, is detected by the position sensors 15 and 16, and the detected signal is sent through a position detection circuit 34 in the magnetic bearing controller 33 and an A/D converter 35 to the CPU 27.

Figure 4:
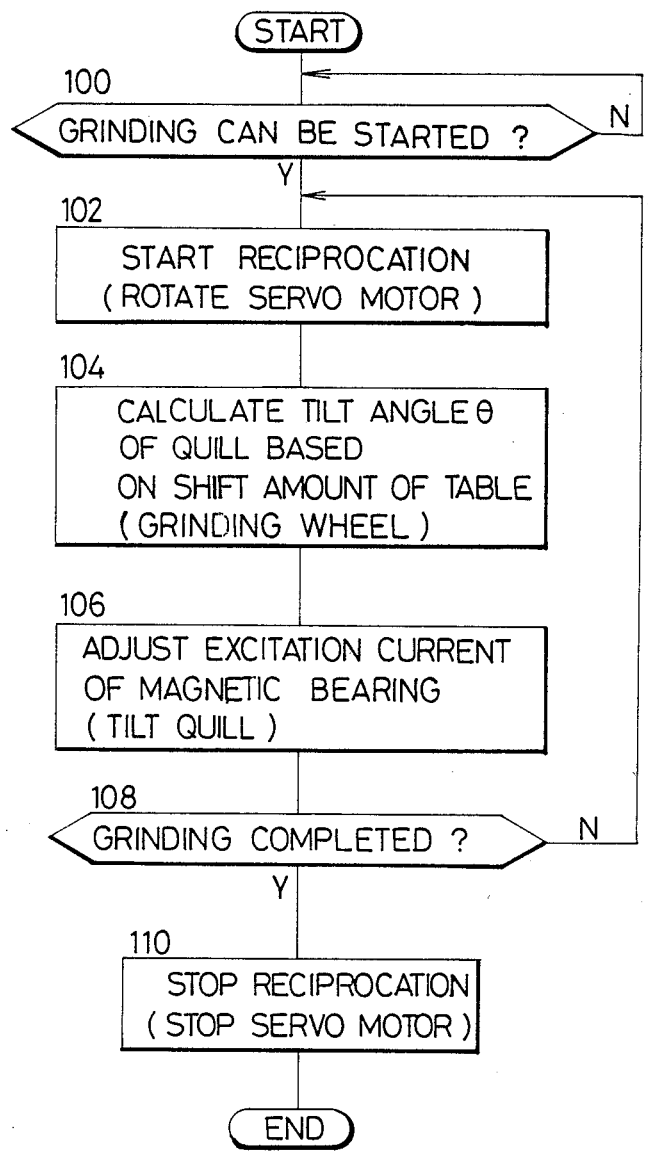
FIG. 4 is a flow chart showing the operation of a grinding apparatus according to the present invention.
Figure 5:
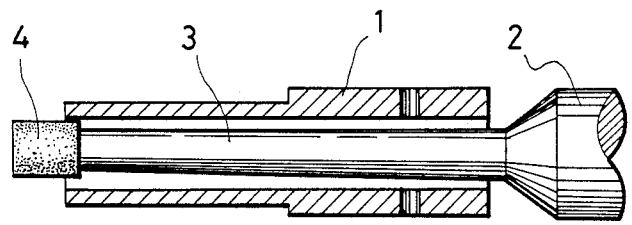
FIG. 5 and FIG. 6 are figures presented for explaining the work of grinding a long bore in a workpiece by an internal grinding apparatus of the prior art.
Figure 6:
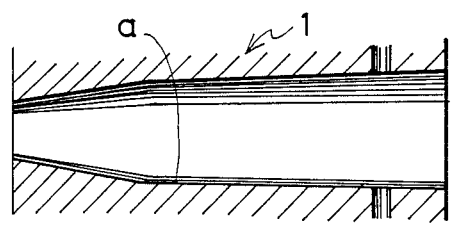

The controlling operation of the CPU is hereunder described with reference to the flow chart in FIG. 4.

Once grinding work is started with both the workpiece 1 and the spindle rotor 2 being rotated in predetermined directions (STEP 100), reciprocal grinding, or reciprocation, is started in which the grinding wheel 4 is alternately advanced and retrieved in and along the long bore a of the workpiece 1. The reciprocation is carried out by controlling the servo motor 22 with the encoder 24 detecting the position of the work table 19 (STEP 102).

The RAM 26 stores data of positions of the grinding wheel 4 in the long bore a, and data of tilt angles $\theta$ of the grinding wheel 4. Based on a shift amount of the work table 19, a tilt angle $\theta$ of the grinding wheel is computed using the data stored in the RAM 26, and thereby the current to excite the magnetic bearings 15 and 16 is controlled to incline the grinding wheel at the computed tilt angle $\theta$ (STEP 104, 106).

The surface of the long bore a is ground to a predetermined dimension with the tilt angle of the grinding wheel being adjusted (STEP 108, 110).

In the above embodiment, the shift amount of the table 19 is detected by the encoder 24. However, table shift detection equipment composed of a proximity switch device can also be used instead. The proximity switch device is comprised of contactless switches which do not require mechanical contacts for switching operation.

Further, although in the above embodiment, control of the tilt angle of the grinding wheel is continuously carried out in response to the shift of the work table 19, the tilt angle $\theta$ of the grinding wheel can also be adjusted at intervals of predetermined shifts of the work table. However it should be noted that by continuously adjusting the tilt angle of the grinding wheel in the manner described here with reference to the embodiment, a long bore can be ground with high cylindricality and straightness.

It is further understood by those skilled in the art that the foregoing description is a preferred embodiment of the disclosed apparatus and that various changes and modifications may be made in the invention without departing from the spirit and scope thereof.

I claim:

1. An internal grinding machine comprising;
   a spindle rotor having a grinding wheel fixed at one end thereof through a grinding wheel shaft;
   a spindle head encompassing said spindle rotor;
   rotational driving means for rotationally driving a workpiece having a bore about an axis of rotation parallel with the bore;
   feeding means for providing relative movement between said grinding wheel and the workpiece;
   electromagnetic bearing means coupled with said spindle rotor for magnetically floating and supporting said spindle rotor;
   sensing means for detecting a position of said spindle rotor relative to said electromagnetic bearing means;
   means for sensing the axial position of the grinding wheel relative to a surface of the bore;
   calculating means for calculating a predetermined tilt angle of said grinding wheel relative to the axis of rotation of the workpiece for different axial positions of said grinding wheel relative to a surface of the bore in the workpiece and including means for storing data corresponding to the tilt angle for each relative position; and
   control means for controlling said electromagnetic bearing means to tilt the axis of said spindle rotor at the calculated predetermined tilt angle of said grinding wheel for the said positions sensed by the means sensing the axial position of the grinding wheel relative to the surface of the bore.

2. The internal grinding machine defined in claim 1; wherein said control means includes means to continuously control said electromagnetic bearing means until the bore of the workpiece is ground to a predetermined size.

3. The internal grinding machine defined in claim 1; wherein said electromagnetic bearing means includes radial electromagnetic bearing means for magnetically floating and supporting said spindle rotor in a radial direction, and axial electromagnetic bearing means for magnetically supporting said spindle rotor in an axial direction.

4. The internal grinding machine defined in claim 1; wherein said sensor means includes radial position sensor means for detecting a radial position of said spindle rotor, and axial position sensor means for detecting an axial position of said spindle rotor.

5. The internal grinding machine defined in claim 1; wherein said feeding means includes X-direction means for providing a relative movement between said grinding wheel and the workpiece in the direction of the axis of rotation of the workpiece and Y-direction feeding means for providing a relative movement between said grinding wheel and the workpiece in the direction perpendicular to the axis of rotation of the workpiece.

6. The internal grinding machine defined in claim 5; wherein said X-direction feeding means further comprises means for imparting a reciprocative movement between said grinding wheel and the workpiece in the direction of the axis of rotation of the workpiece during grinding.

7. An internal grinding machine comprising:
a spindle rotor having a grinding wheel fixed at one end thereof through a grinding wheel shaft;
a spindle head encompassing said spindle rotor;
rotational driving means for rotationally driving a workpiece having a bore about an axis of rotation parallel with the bore;
feeding means for providing relative movement between said grinding wheel and the workpiece;
electromagnetic bearing means coupled with said spindle rotor for magnetically floating and supporting said spindle rotor;
sensing means for detecting a position of said spindle rotor relative to said electromagnetic bearing means;
means for sensing the axial position of the grinding wheel relative to a surface of the bore;
calculating means for calculating a predetermined shift of said spindle rotor parallel to the axis of rotation of the workpiece for different axial positions of said grinding wheel relative to a surface of the bore in the workpiece and including means for storing data corresponding to the shift for each relative position; and
control means for controlling said electromagnetic bearing means to tilt the axis of said spindle rotor at the predetermined calculated shift for the axial positions sensed by the means sensing the axial position of the grinding wheel relative to the surface of the bore.

8. The internal grinding machine defined in claim 7; wherein said control means includes means to continuously control said electromagnetic bearing means until the bore of the workpiece is ground to a predetermined size.

9. The internal grinding machine defined in claim 7; wherein said electromagnetic bearing means includes radial electromagnetic bearing means for magnetically floating and supporting said spindle rotor in the radial direction, and axial electromagnetic bearing means for magnetically supporting said spindle rotor in an axial direction.

10. The internal grinding machine defined in claim 7; wherein said sensor means includes radial position sensor means for detecting a radial position of said spindle rotor, and axial position sensor means for detecting an axial position of said spindle rotor.

11. The internal grinding machine defined in claim 7; wherein said feeding means includes X-direction feeding means for providing a relative movement between said grinding wheel and the workpiece in the direction of the axis of rotation of the workpiece and Y-direction feeding means for providing a relative movement between said grinding wheel and the workpiece in the direction perpendicular to the axis of rotation of the workpiece.

12. The internal grinding machine defined in claim 11, wherein said X-direction feeding means further comprises means for imparting a reciprocative movement between said grinding wheel and the workpiece in the direction of the axis of rotation of the workpiece during grinding.

13. An internal grinding machine comprising:
a spindle rotor;
means fixing a grinding wheel to one end of the rotor;
means for rotatably driving a workpiece having a bore about an axis of rotation parallel to the bore;
means for relatively axially moving the workpiece and the grinding wheel;
electromagnetic bearing means for magnetically floating and supporting said spindle rotor in any one of a plurality of tilt angles relative to the axis of rotation;
means for storing a predetermined tilt angle for the rotor for each of a plurality of relative axial positions of the grinding wheel and workpiece;
means for sensing the relative axial position of the workpiece and grinding wheel; and
means responsive to the sensed relative axial position of the workpiece and grinding wheel for controlling the electromagnetic bearing means to move the rotor into the predetermined tilt angle for said sensed relative axial position.

14. The internal grinding machine defined in claim 13; wherein said control means includes means for continuously controlling said electromagnetic bearing means until the bore of the workpiece is ground to a predetermined size.

15. The internal grinding machine defined in claim 13; wherein said electromagnetic bearing means includes radial electromagnetic bearing means for magnetically floating and supporting said spindle rotor in a radial direction, and axial electromagnetic bearing means for magnetically supporting said spindle rotor in an axial direction.

16. The internal grinding machine defined in claim 15; further comprising radial position sensor means for detecting a radial position of said spindle rotor, and axial position sensor means for detecting an axial position of said spindle rotor.

17. The internal grinding machine defined in claim 13; wherein the moving means includes X-direction feeding means for providing a relative movement between said grinding wheel and the workpiece in the direction of the axis of rotation of the workpiece and Y-direction feeding means for providing a relative movement between said grinding wheel and the workpiece in the direction perpendicular to the axis of rotation of the workpiece.

18. The internal grinding machine defined in claim 17; wherein said X-direction feeding means further comprises means for reciprocatively relatively moving said grinding wheel and the workpiece in the direction of the axis of rotation of the workpiece during grinding.

19. An internal grinding machine comprising:
a spindle rotor;
means fixing a grinding wheel to one end of the rotor;
means for rotatably driving a workpiece having a bore about an axis of rotation parallel to the bore;
means for relatively axially moving the workpiece and the grinding wheel;
electromagnetic bearing means for magnetically floating and supporting said spindle rotor in any one of a plurality of shift positions perpendicular to the axis of rotation while maintaining the rotor parallel to the axis of rotation;
means for storing a predetermined shift for the rotor for each of a plurality of relative axis positions of the grinding wheel and workpiece;

means for sensing the relative axial position of the workpiece and grinding wheel; and means responsive to the sensed relative axial position of the workpiece and grinding wheel for controlling the electromagnetic bearing means to move the rotor into the predetermined shift for said sensed relative axial position.

20. The internal grinding machine defined in claim 19; wherein said control means includes means for continuously controlling said electromagnetic bearing means until the bore of the workpiece is ground to a predetermined size.

21. The internal grinding machine defined in claim 19; wherein said electromagnetic bearing means includes radial electromagnetic bearing means for magnetically floating and supporting said spindle rotor in a radial direction, and axial electromagnetic bearing means for magnetically supporting said spindle rotor in an axial direction.

22. The internal grinding machine defined in claim 21; further comprising radial position sensor means for detecting a radial position of said spindle rotor, and axial position sensor means for detecting an axial position of said spindle rotor.

23. The internal grinding machine defined in claim 19; wherein the moving means includes X-direction feeding means for providing a relative movement between said grinding means and the workpiece in the direction of the axis of rotation of the workpiece and Y-direction feeding means for providing a relative movement between said grinding wheel and the workpiece in the direction perpendicular to the axis of rotation of the workpiece.

24. The internal grinding machine defined in claim 23; wherein said X-direction feeding means further comprises means for reciprocatively relatively moving said grinding wheel and the workpiece in the direction of the axis of rotation of the workpiece during grinding.

* * * * *